INVENTOR
ANDRE ERTAUD

United States Patent Office 3,131,942
Patented May 5, 1964

3,131,942
FLUID-TIGHT DEVICES FOR ROTATING SHAFTS
André Ertaud, Paris, France, assignor to Société Anonyme dite: Societe Alsacienne de Constructions Mecaniques, Paris, France, a corporation of France
Filed July 13, 1959, Ser. No. 826,743
Claims priority, application France Sept. 15, 1958
11 Claims. (Cl. 277—53)

In my copending application Serial No. 676,137 filed on August 5, 1957 I have described a device for ensuring fluid-tightness between two media separated by a wall through which passes a rotating shaft, said device comprising a stator rigidly fixed to this wall in a completely fluid-tight manner and forming a sleeve surrounding the rotating shaft with a small clearance, said stator forming, around the said shaft and substantially in its central transverse plane, an annular chamber in which terminate two helicoidal grooves of opposite thread and progressing respectively towards the two extremities of the stator, these grooves being machined in one of the oppositely-facing surfaces of the stator or of the shaft, and having a depth which progressively decreases from the central annular chamber towards the extremities of the stator, accessory means being provided for preventing any passage of gas along the rotor from one extremity of the stator to the other when the shaft is stationary, and being arranged to come into action as soon as, or preferably just before, the stopping of the said shaft takes place.

When the helicoidal grooves are formed in the internal face of the stator, they progress towards the two extremities of said stator in the direction of rotation of the shaft. This progression takes place in the reverse direction when the grooves are formed in the shaft.

It has been found that certain modifications can profitably be carried out in the device which is thus constituted, thereby obtaining better results in its operation, these modifications forming the object of the present invention.

In the first place, the central chamber can be dispensed with, and the device is then constituted by a stator forming a sleeve around the rotating shaft with a small clearance and two helicoidal grooves of opposite thread are cut either in the internal surface of the stator, so as to progress towards the extremities of the stator in the direction of rotation of the shaft, or in the external face of the shaft so as to progress towards the said extremities in the opposite direction, starting from two points located respectively on two generator lines of the stator or of the rotor, said generator lines being diametrically opposite to each other and on each side of a central zone on which no grooves are formed, the said grooves opening out at the extremities of the stator and having a depth which progressively decreases from the said central zone towards the said extremities.

The non-grooved central zone is not necessarily located at the exact half-way point between the extremities of the stator, and the grooved portions on each side of this zone can have different lengths. On the other hand, the two helicoidal grooves are not necessarily symmetrical, as the direction and absolute value of the unitary variation of depth can change along the course of the groove from one extremity to the other.

Finally, the non-grooved central portion can be framed by two circular grooves, into each of which opens the helicoidal groove located on the corresponding side.

The operation of the device in accordance with the invention is similar to that described in my above named copending application, with this essential difference, however, that in the present arrangement, the high degree of vacuum is no longer created in a central annular groove or chamber, but is created independently on both sides of the central portion of the device, at the extremities of each helicoidal groove; the result of this set of conditions is not only that the molecules of gas located on each side of the device are no longer joined together in the central groove but also that their mixture can take place only by passing through a piping system having high resistance to pressure and formed by the cylindrical non-grooved portion of the device. Thus any mixing of the two gases would have to take place by diffusion of the two gases into each other. Since on the one hand, this diffusion can take place only through a high-resistance piping system and on the other hand, the pressures on each side of this piping system are extremely small, the diffusion in question finally proves to be altogether negligible, with the result that, in accordance with the object which it is intended to obtain, the fluid-tightness of the device is practically perfect. Moreover from the mechanical point of view, it should be noted that the great advantage in the present case as compared with the device described in the copending application is that the clearance between the fixed portion and the rotating portion can be considerably increased without reducing the fluid-tightness obtained, thus facilitating the utilization of the device.

The accompanying drawings, represent in axial cross-section several examples of construction of a device in accordance with the invention applied, as in the copending application, to the isolation between, on the one hand, the body of a rotary compressor which effects the circulation at low pressure of a gas such as uranium hexafluoride, and on the other hand, an intermediate chamber filled with nitrogen at low pressure. Only those parts of the machine have been shown which are directly associated with the invention.

Figure 1:
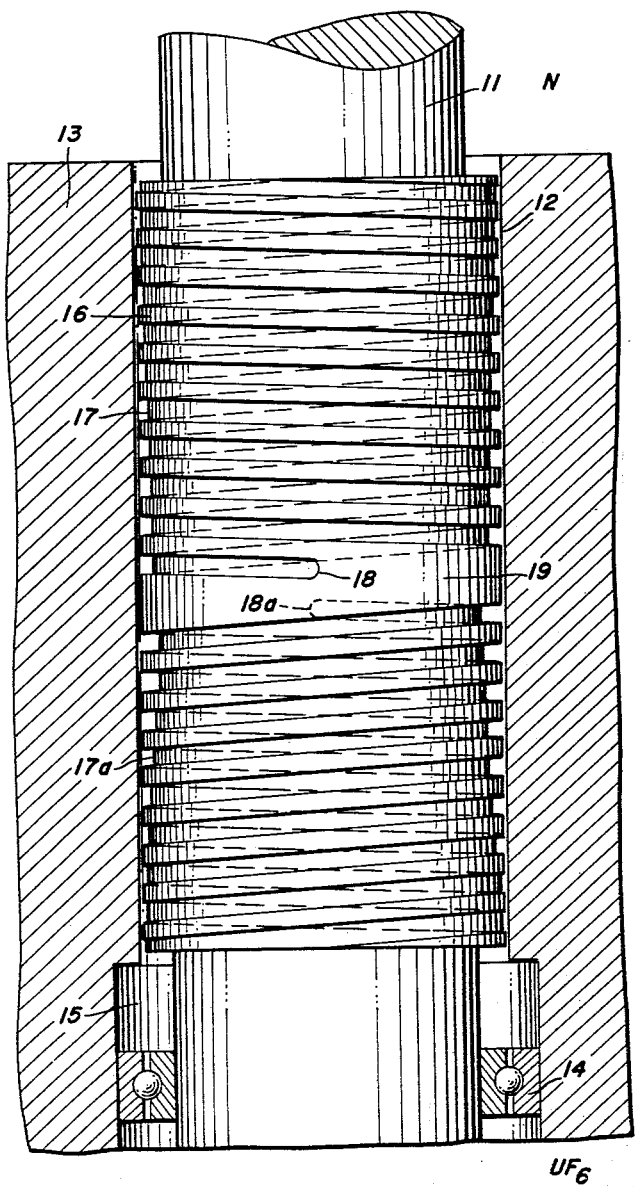
FIG. 1 illustrates an embodiment in which the grooves are formed in the rotor or shaft.

In the example shown in FIG. 1, the compressor comprises a vertical rotating shaft 11 which passes in a smooth bore 12 through a wall 13 below which there exists an atmosphere of uranium hexafluoride $UF_6$ at an absolute pressure of a few centimeters of mercury. On the upper side of the wall 13, there exists an atmosphere of nitrogen N at a pressure equal to or of the same order. The shaft 11 is supported and centered in the bore 13 by means of a bearing 14 arranged in a widened housing 15 and is provided in the said bore with a portion 16 of straight section which is larger than the normal section of the shaft, so that a small clearance described in detail below, is formed between the said portion 16 and the internal surface of the bore 12. In this portion 16 are machined two helicoidal grooves 17 and 17a of opposite thread, respectively cut from two starting points 18 and 18a located on each side of a non-grooved central zone 19. These two grooves each progress helicoidally from the points 18 and 18a towards the extremities of the bore 12 in the reverse direction of rotation of the shaft 11. As as it has been indicated in the numerical table below, in which the constructional characteristics of the device are precisely stated, the depth of the grooves decreases in successive stages from the points of their origin 18 and 18a towards the two extremities of the bore 12 and the number of spirals of the groove 17 on the nitrogen side is greater than that of the groove 17a on the uranium hexafluoride side.

The numerical values given below refer to the rotor 14 and the outline of the grooves 17 and 17a and relate to an example of the device designed to ensure fluid-tightness in the case of the application mentioned above, the pressures of nitrogen and uranium hexafluoride existing on each side of the device being both equal to 40 mm. Hg and the speed of rotation of the shaft being 6,000 r.p.m.

|  | Mm. |
|---|---|
| Clearance between rotor 15 and wall of bore 12 | 0.06 |
| Length of rotor 15 | 300 |
| Diameter of the rotor | 140 |
| Pitch of helicoidal grooves | 15 |
| Width of grooves | 7.5 |

Number of spirals of the groove 17 on the nitrogen side _____ 7

Namely:

|  | Mm. |
|---|---|
| 3 spirals of constant depth | 0.7 |
| 4 spirals progressively increasing from _____ 0.7 to | 4 |
| 3 spirals of constant depth | 4 |

Number of spirals of the groove 17a on the $UF_6$ side _____ 8.5

Namely:

|  | Mm. |
|---|---|
| 3 spirals of constant depth | 0.7 |
| 3¾ spirals progressively increasing from __ 0.7 to | 7 |
| 1¾ spiral of constant depth | 7 |

The parameters which are given above in detail are in each particular case calculated as a function of the pressure of the chambers to be separated, also of the pressure required in the central portion to limit the leakage to the value which it is desired to obtain, of the clearance selected between the stator and rotor, of the diameter of the rotor, of its speed of rotation and of the nature of the gases to be separated.

When the above data are modified, the different parameters are also subjected to variations, the effect of which can be qualitatively defined as follows:

An increase of pressure of the chambers to be separated, for a pre-determined clearance, necessitates an increase in the number of spirals having a constant depth at the two extremities and therefore an increase in the length of the rotor;

A reduction of the pressure required in the central portion necessarily entails an increase in the number of spirals of constant depth in the central portion corresponding to each of the gases to be separated;

An increase in the clearance between the rotor and the stator necessitates an increase in the total number of the spirals and therefore an increase in the length of the rotor, should it be necessary to retain the same pressure at the center and the same counter-pressures at the two extremities;

An increase in the speed of rotation, for a predetermined clearance and a given diameter of rotor, improves the efficiency of the pump and can permit of a reduction of the number of spirals and therefore a reduction in the length of the rotor.

As far as the nature of the gases to be separated is concerned, the apparatus is considerably more effective in the central portion for heavy gases. For these latter, the number of spirals of this portion is smaller than the number of spirals corresponding to a light gas; on the other hand, these same spirals should be deeper for heavy gas.

The following parameters: pitches of helicoidal grooves, width of grooves, have been determined empirically and can be considered as fixed.

Finally, in view of the fact that the phenomenon of the entrainment of molecules by a moveable wall depends on the linear speed of the wall, it is obvious that the speed of rotation of the rotor and the diameter of the rotor are not independent factors.

Figure 2:
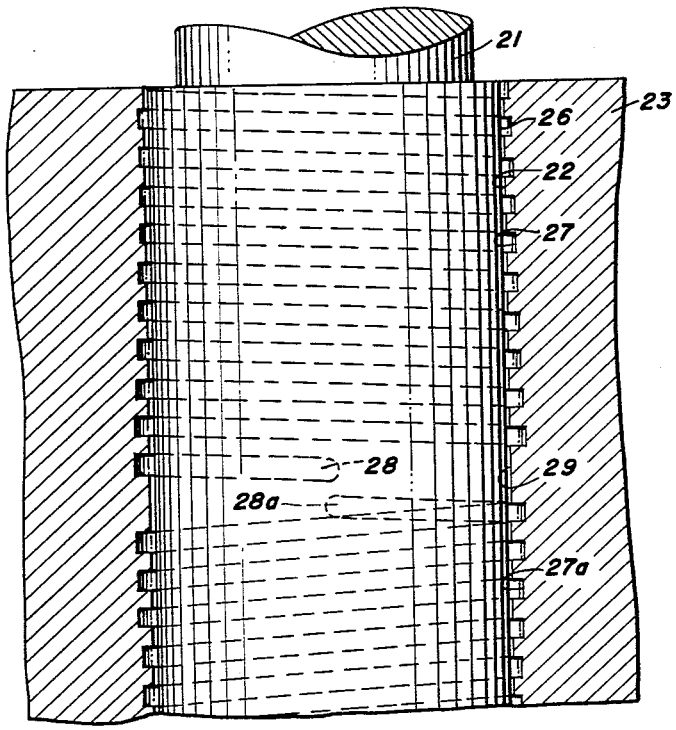
FIG. 2 illustrates an embodiment in which the grooves are formed in the internal face of the housing or stator.

The embodiment of the invention illustrated in FIG. 2 is similar to that of FIG. 1, excepting that its helicoidal grooves are formed in the inner face of the stator or housing rather than in the rotor or shaft. Structures corresponding substantially to those designated by the numerals 11—3 and 16—19 in FIG. 1 are designated in FIG. 2, respectively, by the numerals 21—23 and 26—29.

Figure 3:
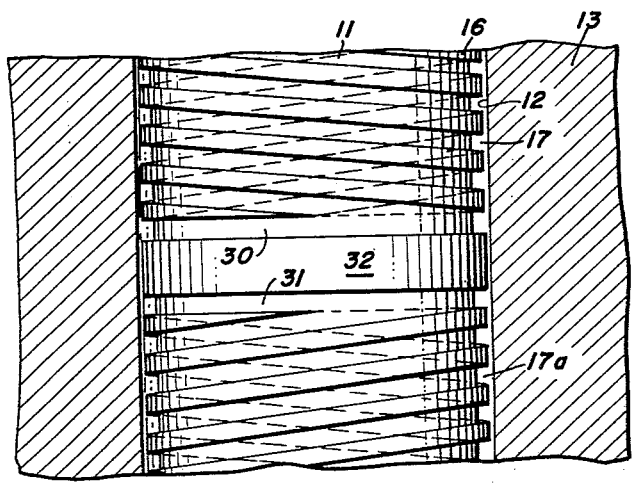
FIG. 3 illustrates an embodiment in which the rotor or shaft is grooved and the inner ends of the helicoidal grooves extend from circular grooves separated by a non-grooved portion of the surface of the shaft.

The embodiment of the invention illustrated in FIG. 3 is similar to that of FIG. 1, excepting that the helicoidal grooves 17 and 17a extend from circular grooves 30 and 31 at their respective inner extremities, and a smoothly cylindrical central part 32 of the surface of the rotor or enlarged shaft portion 16 separates the two circular grooves.

What we claim is:

1. In a device for ensuring fluid-tightness between two chambers containing migratory gaseous media, wherein the chambers are separated by a wall traversed by a rotating shaft: a stator member forming a sleeve around said rotating shaft with a small clearance between the stator and the shaft; said sleeve being imperforate between its ends; two helicoidal grooves having opposite directions of thread formed in the internal surface of said sleeve, and progressing respectively towards the two extremities of said sleeve in the direction of rotation of said shaft, said grooves starting respectively from two diametrically opposite generator lines of the internal surface of said sleeve and from the opposite sides of a non-grooved central zone of said surface, said grooves respectively opening at the sleeve extremities and having a depth which progressively decreases from said central zone to said extremities, whereby the rotation of said shaft creates a substantial vacuum at the inner extremity of each of said grooves.

2. In a device for ensuring fluid-tightness between two chambers containing migratory gaseous media, wherein the chambers are separated by a wall traversed by a rotating shaft: a stator member forming a sleeve around said rotating shaft with a small clearance between the stator and the shaft; said sleeve being imperforate between its ends; two helicoidal grooves having opposite directions of thread formed in the external surface of said shaft and progressing respectively towards the two extremities of said sleeve in the direction opposite to the direction of rotation of said shaft, said grooves starting respectively from two diametrically opposite generator lines of the external surface of said shaft and from the opposite sides of a non-grooved central zone of said surface, said grooves respectively opening at the sleeve extremities and having a depth which progressively decreases from said central zone to said extremities, whereby the rotation of said shaft creates a substantial vacuum at the inner extremity of each of said grooves.

3. In a device for insuring fluid-tightness between two chambers containing migratory gaseous media, wherein the chambers are separated by a wall traversed by a rotating shaft member; a stator member fixed in said wall in a totally fluid tight manner and forming an imperforate sleeve around said rotating shaft member with a small clearance between the adjacent surfaces of said members; two helicoidal grooves formed in one of said surfaces and having opposite directions of thread and progressing respectively towards the two extremities of said sleeve, said grooves starting respectively from two diametrically opposite generator lines of said one surface and from the opposite sides of a non-grooved central zone of said one surface, said grooves respectively opening at the sleeve extremities and having a depth which progressively decreases from said central zone to said extremities, whereby upon rotation of said shaft at high speed in the direction to lead gaseous molecules away from said central zone a substantial vacuum is created in each of said grooves at the inner extremity thereof and gaseous communication between said grooves is obstructed by said central zone.

4. A device as claimed in claim 3, in which said grooves on each side of said central zone are of different lengths.

5. A device as claimed in claim 3, in which said grooves on each side of said central zone are asymmetrical.

6. A device as claimed in claim 3, in which said non-grooved central zone is delimited axially by two circular grooves from which start respectively the corresponding helicoidal grooves.

7. A device as claimed in claim 3, in which the sense and the absolute value of the variation in depth per unit length of said helicoidal grooves vary from one extremity of each groove to the other.

8. Apparatus for ensuring fluid-tightness between two chambers containing migratory fluid media, comprising a housing member and a rotatable shaft member, said housing member being adapted to form part of a wall separating said chambers and having a bore therethrough and being imperforate between the ends of said bore, said shaft member extending through said bore and having a diameter less than that of said bore and thereby defining a clearance space within said housing member, one of said members being provided with oppositely directed helicoidal grooves extending in opposite directions around and along said bore from a portion of the surface of said one member at the inner extremities of said grooves, said surface portion comprising a central part lying close to the other of said members, whereby gaseous communication between said grooves is obstructed by said central part and the relative rotation of said members at high speed creates a substantial vacuum at each of said inner extremities.

9. Apparatus for ensuring fluid-tightness between two chambers containing migratory fluid media, comprising a housing member and a rotatable shaft member, said housing member being adapted to form part of a wall separating said chambers and having a bore therethrough and being imperforate between the ends of said bore, said shaft member extending through said bore and having a diameter less than that of said bore and thereby defining a clearance space within said housing member, one of said members being provided with oppositely directed helicoidal grooves extending in opposite directions around and along said bore from a portion of the surface of said one member at the inner extremities of said grooves, said surface portion comprising a central part lying close to the other of said members and said grooves having depths which increase toward said inner extremities, whereby gaseous communication between said grooves is obstructed by said central part and the relative rotation of said members at high speed creates a substantial vacuum at each of said inner extremities.

10. Apparatus comprising a housing member and a rotatable shaft member, said housing member having a bore therethrough and said shaft member extending through said bore and having a diameter less than that of said bore and thereby defining a clearance space within said housing member, one of said members being provided with oppositely directed helicoidal grooves extending in opposite directions around and along said bore from a portion of the surface of said one member disposed between the inner extremities of said grooves, said surface portion comprising a central part lying close to the other of said members and an annular groove at either side of said central part, said helicoidal grooves opening into said annular grooves at said inner extremities, whereby gaseous communication between said helicoidal grooves is obstructed by said central part and relative rotation of said members at high speed creates a substantial vacuum at each of said inner extremities.

11. Apparatus comprising a housing member and a rotatable shaft member, said housing member having a bore therethrough and said shaft member extending through said bore and having a diameter less than that of said bore and thereby defining a clearance space within said housing member, one of said members being provided with oppositely directed helicoidal grooves extending in opposite directions around and along said bore from a portion of the surface of said one member disposed between the inner extremities of said grooves, said surface portion comprising a central part lying close to the other of said members and an annular groove at either side of said central part, said helicoidal grooves opening into said annular grooves at said inner extremities and having depths which increase toward said extremities, whereby gaseous communication between said helicoidal grooves is obstructed by said central part and relative rotation of said members at high speed creates a substantial vacuum at each of said inner extremities.

References Cited in the file of this patent

UNITED STATES PATENTS

| | | |
|---|---|---|
| 391,071 | Parsons | Oct. 16, 1888 |
| 752,170 | Krogh | Feb. 16, 1904 |
| 2,064,703 | Van De Graaff | Dec. 15, 1936 |
| 2,487,177 | Pollock | Nov. 8, 1949 |

FOREIGN PATENTS

| | | |
|---|---|---|
| 148,932 | Great Britain | Oct. 10, 1921 |
| 491,366 | Germany | Feb. 10, 1930 |